US006787091B2

United States Patent
Dalton et al.

(10) Patent No.: US 6,787,091 B2
(45) Date of Patent: Sep. 7, 2004

(54) REACTION INJECTION AND COMPRESSION MOLDING OF A GOLF BALL

(75) Inventors: Jeffrey L. Dalton, Dartmouth, MA (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/278,525

(22) Filed: Oct. 23, 2002

(65) Prior Publication Data

US 2004/0080080 A1 Apr. 29, 2004

(51) Int. Cl.[7] .......................... B29C 35/02; B29C 45/14; B29C 45/36; B29C 45/56
(52) U.S. Cl. ....................... 264/260; 264/275; 264/278; 264/279.1; 264/328.7
(58) Field of Search ................................. 264/240, 260, 264/259, 271.1, 275, 278, 279.1, 328.7; 425/127, 129.1, 543, 577, 589

(56) References Cited

U.S. PATENT DOCUMENTS

| | | | | |
|---|---|---|---|---|
| 5,536,458 A | * | 7/1996 | Kawakita et al. | 264/46.6 |
| 6,083,119 A | | 7/2000 | Sullivan et al. | 473/354 |
| 6,117,025 A | | 9/2000 | Sullivan | 473/373 |
| 6,152,834 A | | 11/2000 | Sullivan | 473/365 |
| 6,277,035 B1 | | 8/2001 | Sullivan et al. | 473/374 |
| 6,287,217 B1 | | 9/2001 | Sullivan et al. | 473/374 |
| 6,290,614 B1 | | 9/2001 | Kennedy, III et al. | 473/378 |
| 6,315,681 B1 | | 11/2001 | Sullivan | 473/373 |
| 6,319,451 B1 | | 11/2001 | Brune | 264/278 |
| 6,325,731 B1 | | 12/2001 | Kennedy, III et al. | 473/377 |
| 6,398,667 B1 | | 6/2002 | Lemons | 473/374 |
| 2001/0012805 A1 | | 8/2001 | Tzivanis et al. | |
| 2001/0016523 A1 | | 8/2001 | Sullivan | |
| 2001/0024979 A1 | | 9/2001 | Nesbitt et al. | |
| 2001/0024981 A1 | | 9/2001 | Binette et al. | |
| 2001/0031671 A1 | | 10/2001 | Sullivan | |
| 2001/0039219 A1 | | 11/2001 | Sullivan | |
| 2001/0039220 A1 | | 11/2001 | Kennedy, III et al. | |

OTHER PUBLICATIONS

U.S. patent application Ser. No. 09/877,600, Kennedy, III et al., filed Jun. 8, 2001.
U.S. patent application Ser. No. 09/873,594, Sullivan, filed Jun. 4, 2001.
U.S. patent application Ser. No. 09/832,154, Sullivan, filed Apr. 10, 2001.
U.S. patent application Ser. No. 09/839,816, Binnette et al., filed Apr. 20, 2001.
U.S. patent application Ser. No. 09/829,708, Nesbitt et al., filed Apr. 10, 2001.
U.S. patent application Ser. No. 09/782,140, Sullivan, filed Feb. 12, 2001.
U.S. patent application Ser. No. 09/812,878, Tzivanis et al., filed Mar. 20, 2001.

* cited by examiner

Primary Examiner—Angela Ortiz

(57) ABSTRACT

A method of molding a layer of a thermoset or thermoplastic material around a golf ball component within a mold, in which the component is positioned within a mold cavity defined by opposing mold portions of the mold, to leave a cavity space between the component and the mold portions. A reaction mixture comprising at least two reactants is injected under a hydraulic pressure into the cavity space. The pressurized reaction mixture pushes the mold portions apart from each other to a partially open position with an opening therebetween. The reaction mixture is allowed to react partially within the cavity space, and then the mold portions are compressed toward each other to the closed position. The reaction mixture further reacts to form the layer of the thermoset or thermoplastic material immediately about the component.

22 Claims, 6 Drawing Sheets

REACTION INJECTION AND COMPRESSION MOLDING OF A GOLF BALL

FIELD OF THE INVENTION

This invention relates generally to a method of making a golf ball and, more particularly, to reaction injection and compression molding of a thin layer in a golf ball.

BACKGROUND OF THE INVENTION

Golf balls are typically comprised of a cover that is compression molded, injection molded, or cast over a golf ball core and which may include one or more wound or solid layers and also a liquid or solid center. Individual layers, including outer core layers, intermediate layers, inner cover layer and outer cover layers are generally either compression or injection molded.

In compression molding, previously molded hemispheres are placed around a core to form a shell. The subassembly is placed between two compression mold halves, which are then heated and pressed together. The shells are often thickest at their deepest point to enhance good surface formation and evacuation of entrapped gases. Compression molding does not require support member for the core or other components for adding materials. Details on the compression molded product, such as dimples, are in general significantly sharper than that of injection molding. However, compression molding does necessitate pre-production of the molded half shells around the core, and pre-alignment of the shells within the mold halves by hand or by machine. Furthermore, weak points form at the parting line where the material of the two shells melt and flow together.

Injection molding is generally conducted between two mold halves that together define a mold cavity in which the core is supported with fixed or retractable pins. Cover material is melted at high temperature and injected at high pressures into the mold cavity and around the core. The preferred retractable pins are withdrawn when the cover material is solid enough to support the core, yet soft enough to fill the remaining space left by the pins. Injection molding methods are typically conducted with the mold closed, with plastic pressures upwards of about 12,000 psi. These high pressures tend to deform the golf ball core through compression. Also, equipment for injection molding typically includes extremely small air vents, which significantly limit the injection speed of the cover or layer material.

Generally, multiple ports around the core are used to inject the cover or layer material to speed the injection process. Where material flowing from the various ports meet, weld lines, or knit lines, can be formed, resulting in discontinuities and residual stresses across the weld lines. This results in poor finishes with poor definition of features such as dimples that are molded into the layer or cover. Golf ball material failures also tend to occur at the weld lines after repeated use of the golf ball. Due to friction between the injected material and the mold cavity and core, the material catches at various locations on the mold halves and core during its injection, creating more internal stresses and further decreasing the homogeneity of the molded material. These stresses also tend to produce lower quality finishes and areas that are more prone to structural failure.

As with the above-referenced processes, a casting process also utilizes pairs of mold cavities. In a casting process, a cover material, typically a thermoset polyurethane, is introduced into a first mold cavity of each pair. Then, a core is held in position (e.g. by an overhanging vacuum or suction apparatus) to contact the cover material in what will be the spherical center of the mold cavity pair. Once the cover material is at least partially cured (e.g., a point where the core will not substantially move), the core is released, the cover material is introduced into a second mold cavity of each pair, and the mold is closed. The closed mold is then subjected to heat and pressure to cure the cover material thereby forming a cover on the core. With injection molding, compression molding, and casting, the molding cavities typically include a negative dimple pattern to impart a dimple pattern on the cover during the molding process.

Recently, a particular form of injection molding, reaction injection molding ("RIM"), has been receiving increased attention, particularly as a method of forming a polyurethane or polyurea based cover or layer in a golf ball. RIN is a process by which highly reactive liquid components are injected into a closed mold, mixed usually by impingement and/or mechanical mixing in an in-line device such as a "peanut mixer," where they polymerize primarily in the mold to form a coherent, one-piece molded article. The RIM process usually involves a rapid reaction between the reactive liquids, often in the presence of a catalyst. The liquids are stored in separate tanks, preheated to about 90° F. to 150° F., metered in the desired weight to weight ratio and fed into an impingement mix head, with mixing occurring under high pressure, e.g., 1,500 to 3,000 psi. The material is then injected into the mold, in where the liquids react rapidly to gel and form polymers such as polyurethanes, polyurea, epoxies, and various unsaturated polyesters. Both the mix head and the mold are heated to ensure proper injection viscosity of the material.

Because RIM involves a chemical reaction that transforms liquid monomers and/or adducts into polymers, its mold need not be made to withstand the high temperatures and high pressures in conventional injection molding. Plus, the RIM process is fast. The chemical reaction causes the material to set in less than one minute and in many cases in about 10 seconds or less. However, the close mold design in conventional RIM limits the thickness of the molded cover or layer to be no less than about 0.02 inches. Thinner covers and layers in golf ball are preferred for various reasons. Ultra-thin layers can provide a transition between a soft outer cover layer and a hard inner cover layer, providing a means to tune the golf ball's spin rate profile for medium to short iron play. Alternatively, as an inner cover layer, an ultra-thin layer can reduce driver spin.

Therefore, it is desirable to provide a method for molding ultra-thin layers in golf balls that combine the advantages of reaction injection molding and compression molding, while eliminating their shortcomings.

SUMMARY OF THE INVENTION

The present invention is directed to a method of making golf balls and, in particular, a method of molding a thin layer of a thermoset or thermoplastic material around a golf ball component. The thin layer may be continuous or discontinuous. In a preferred embodiment, the method involves a mold having a mold cavity defined by opposing mold potions. The golf ball component is centered within the mold cavity by a plurality of support members such as retractable pins, and the mold portions are held together with a first tonnage, leaving a cavity space between the component and the mold portions.

A pre-mixed reaction mixture is injected into the cavity space under a first tonnage. The mixture comprises an isocyanate and a polyol or polyamine, with one or more optional additives such as curing agents, crosslinking agents, catalysts, fillers, accelerators, processing aids, processing oils, plasticizers, foaming agents, colorants, or radical quenchers. The pressurized mixture overcomes the first tonnage, pushes the mold portions apart from each other to a partially open position with an opening therebetween, and fills the cavity space. Preferably the opening between the mold portions is at least about 0.001 inches; more preferably, it ranges from about 0.001 inches to about 0.015 inches.

After a sufficient amount of the mixture has been injected to maintain the component substantially in the predetermined position, the support members are removed. As the reaction mixture fills the cavity space, the reactants react partially within the cavity space. After at least about 80 percent of the cavity space is injected with the reaction mixture, a second and higher tonnage is provided that is sufficient to overcome the hydraulic pressure of the reaction mixture and compress the mold portions toward each other to the closed position to compression mold the thin layer. Preferably, the second tonnage is at least about 20 percent greater than the first tonnage. Alternatively, the hydraulic pressure is removed in the compression molding phase so that the first tonnage is sufficient to compress the mold portions and close them back together.

While in the cavity space, the reaction mixture completes its reaction and is cooled to a temperature below its freezing point to form the thin layer of the thermoset or themoplastic material immediately about the golf ball component. Preferably the thin layer has a thickness of no greater than about 0.03 inches, more preferably from about 0.0005 inches to about 0.02 inches, and most preferably from about 0.001 inches to about 0.01 inches.

An alternative method of molding the thin layer starts with the opposing mold portions held apart with the opening of at least about 0.001 inches therebetween. The reactants are preheated and mixed to form the reaction mixture, which is then injected into the cavity space at a plurality of locations and allowed to partially react. Compression molding is initiated preferably after at least about 80 percent of the cavity space is filled with the reaction mixture. The mold portions are compressed toward each other to a closed position under a tonnage. The thermoset or thermoplastic material formed form the mixture substantially encapsulates the component with a layer of from about 0.0005 inches to about 0.02 inches thick.

In a further embodiment of the present invention, a method of molding the thin layer involves injecting a pre-mixed reaction mixture of at least two reactants under a hydraulic pressure into the cavity space through an opening of at least about 0.001 inches between the mold portions to surround the component, filling at least about 80% of the cavity space with the mixture. Compression molding ensues after the mixture is partially reacted, by using a tonnage to close the mold portions together. The reaction mixture completes the reaction and forms the thin layer of a thermoset or thermoplastic material around the component no greater than about 0.03 inches in thickness.

DETAILED DESCRIPTION OF THE INVENTION

Figure 1:
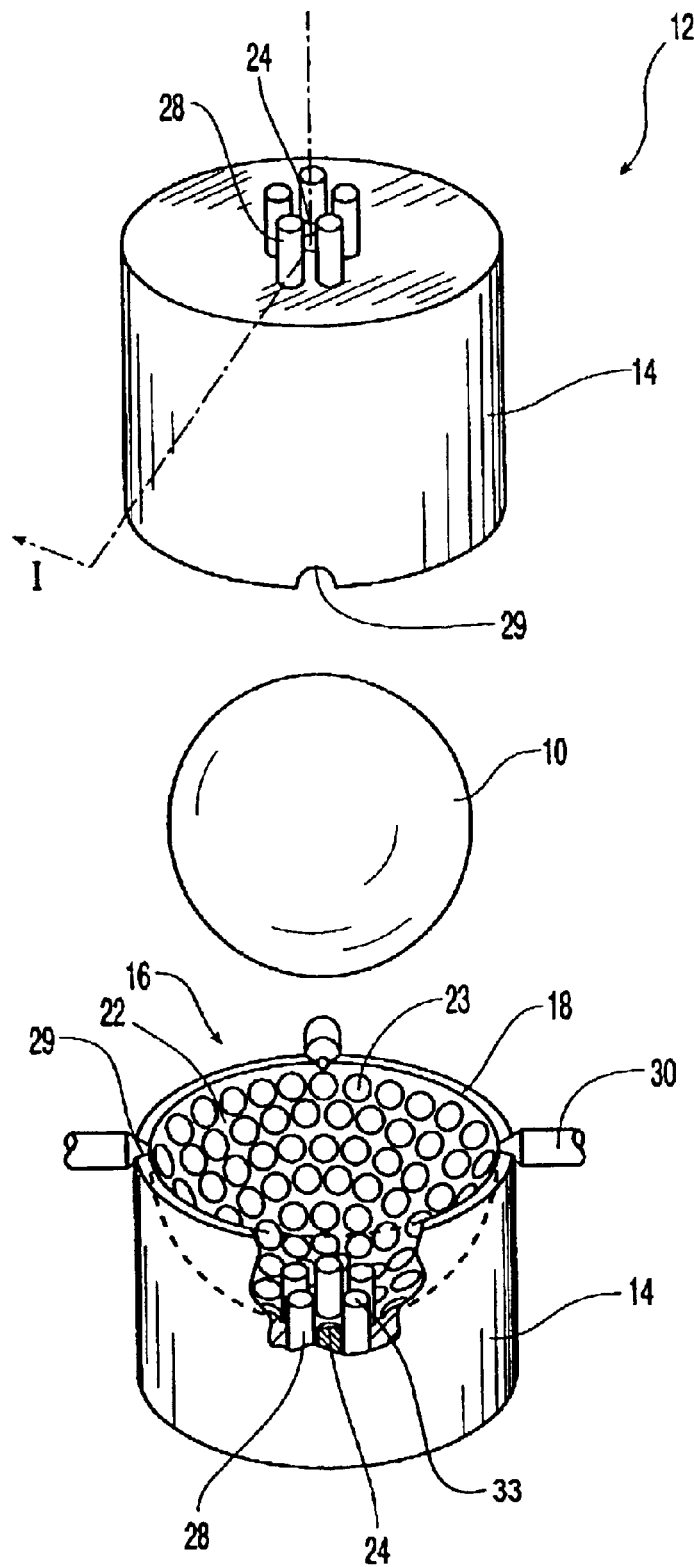
FIG. 1 is a perspective view of an open mold constructed according to the invention.

Broadly, the present invention is directed to a method of making layer or cover components in a golf ball. In particular, the invention is directed to a reaction injection and compression molding ("RICM") process for forming thin layers or covers of thermoset or thermoplastic materials in a golf ball. Thin layer can provide an outer cover or a transition between a soft outer cover layer and a hard inner cover layer, providing the ball designer a means to tune the spin rate profile for medium to short iron play. Alternatively, as an inner layer, the thin layer can also act to reduce driver spin rates while maintaining wedge spin rates.

Furthermore, the thin layer may be a continuous layer such as a spherical shell or a spherical lattice network, or a discontinuous layer having a plurality of discrete elements that are unform in their thickness. Preferably, the thin layer covers from about 10% to about 100% of the surface area of the underlying golf ball component such as the core. More preferably, the thin layer covers from about 30% to about 100% of the surface area of the underlying component. The lattice network can of any shape and form, preferably having at least three bands extending along great circle paths of the underlying golf ball component such as the core. More preferably the bands along great circle paths form a spherical Platonic or Archimedean solid. The discrete elements of the discontinuous layer may comprise islands having various shapes such as circles, triangles and hexagons.

The golf ball may be a two-piece, multi-layer, or wound ball having cores, intermediate layers, covers and/or coatings. A "cover" or a "core" as these terms are used herein includes a structure comprising either a single mass or one with two or more layers. As used herein, a core described as comprising a single mass means a unitary or one-piece core. The layer thus includes the entire core from the center of the core to its outer periphery. A core, whether formed from a single mass, two or more layers, or a liquid center may serve as a center for a wound ball. An intermediate layer may be incorporated, for example, with a single layer or multi-layer cover, with a single mass or multi-layer core, with both a single layer cover and core, or with both a multi-layer cover and a multi-layer core. A layer may additionally be composed of a tensioned elastomeric material. Intermediate layers of the type described above are sometimes referred to in the art, and, thus, herein as well, as an outer core layer, an inner cover layer, an outer core layer, or a mantle layer.

Referring now to the figures, a discussion of the above features with respect to preferred embodiments is provided below. It should be understood that such embodiments are for illustrative purposes, and should not be construed as limiting the scope of the invention. Portions of the preferred methods and designs of the present invention are set forth in U.S. Pat. No. 6,319,451, which is incorporated herein expressly by reference in its entirety. Preferably, the methods disclosed herein are used to mold a layer of thermoset material around a golf ball component, more preferably the thermoset material is a thermoset polyurethane or polyurea. Alternatively, the same methods can be applied to thermoplastic materials such as thermoplastic polyurethane or polyurea.

Figure 2:
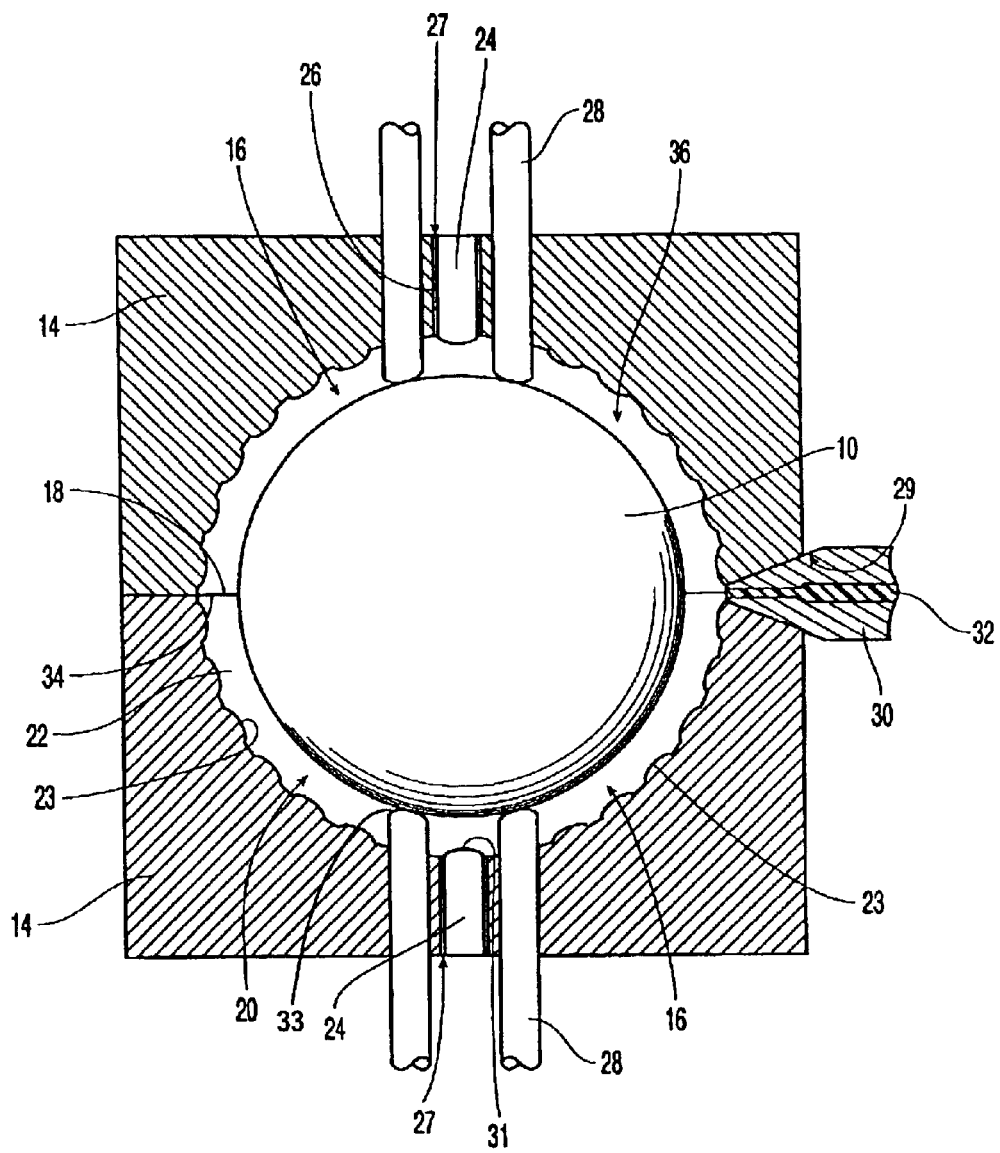
FIG. 2 is a diagrammatic cross-sectional view of the mold in a closed position prior to reaction injection molding.

FIGS. 1 and 2 shows a golf ball component 10 and a mold 12. The golf ball component 10 is preferably a golf ball core, and can be a subassembly comprising a core and any number of outer core layers, wound layers, intermediate layers, and inner cover layers. The mold 12 includes opposing mold portions 14. Each mold portion 14 has an inner surface 22 that defines a cavity 16, and a circumference mating surface 18 that faces the opposing mold portion 14. When the mold 12 is assembled and fully closed, the mold portions 14 are brought together with the mating surfaces 18 in full contact with each other. The cavities 16 unite to define a shell-shaped cavity space 20 between the mold portions 14 and the golf ball component 10. In the preferred embodiment, the cavities 16 and the golf ball component 10 are substantially spherical and concentric with each other, so that the cavity space 20 has a substantially uniformed thickness which is equivalent to the thickness of the molded cover or layer. The RICM process is capable of molding layers or covers of any thickness, preferably from about 0.001 inches to about 0.5 inches. For cost-effective reasons, the thickness of the molded layer or cover is less than about 0.03 inches, preferably less than about 0.02 inches, more preferably from about 0.0005 inches to about 0.01 inches, and most preferably from about 0.0005 inches to about 0.0075 inches. In the embodiments where the cover or the outer cover layer of a golf ball is to be molded according to the present invention, inner surfaces 22 include a negative dimple pattern with a plurality of protrusions 23 that form dimples in the finished golf ball cover or layer. Preferably, each of the protrusions 23 has a concave profile and a substantially circular shape, resulting in circular dimples on the molded cover or outer cover layer. Alternatively, the protrusions 23 can feature a convex profile and a substantially non-circular shape, such as oblong, ellipse, triangle, square, rectangle, pentagon, hexagon, polygon, and the like. Furthermore, the protrusions 23 may have various cross-sectional profiles that complement the desired dimple profiles, including circular curves, parabolic curves, ellipses, semi-spherical curves, saucer-shaped curves, sinusoidal curves, truncated conical curves, flattened trapezoidal curves, as well as catenary curves disclosed in U.S. Pat. No. 09/989,191, which is incorporated herein by reference in its entirety.

The golf ball component 10 is held in a predetermined position, preferably centered within the mold 12, by a support member that comprises support pins 28 extending through each mold portions 14 into the cavity space 20. Surfaces 33 of the support pins 28 engaged with the outer surface of the golf ball component 10 are preferably shaped to form dimples in the cover or cover layer molded therein. Preferably, each surface 33 of the support pin 28 has a concave profile and a substantially circular shape, resulting in circular dimples on the molded cover or outer cover layer. Alternatively, the surfaces 33 can feature a convex profile and non-circular shape, such as oblong, elliptical, triangular, square, rectangular, pentagonal, hexagonal, polygonal, and the like. When the molded layer is other than a cover or an outer cover layer, the surfaces 33 preferably have a concave profile and a substantially circular shape, as spherical portions of the inner surface 22 of the mold cavity 14. Each mold portion 14 has at least one support pin 28, preferably about 3–5. Other types of support members such as protrusions may also be employed in alternative embodiments.

Also extending through each mold portion 14 to the inner surface 22 is a fixed vent pin 24. The diameter of the vent pins 24 is slightly smaller than that of the surrounding bores 26 to provide in between a tubular gap vent 27 of about 0.0002 inches to about 0.0005 inches. The vents 27 thus communicate the cavity space 20 with the exterior space for venting air during molding cycles, particularly while the mold 12 is in closed positions. Surfaces 31 of the vent pins 24 facing the cavity space 20 preferably have a concave profile and a substantially circular shape, resulting in circular dimples on the molded cover or outer cover layer. Alternatively, the surfaces 31 can feature a convex profile and non-circular shape, such as oblong, elliptical, triangular, square, rectangular, pentagonal, hexagonal, polygonal, and the like. When the molded layer is other than a cover or an outer cover layer, the surfaces 31 preferably have a concave profile and a substantially circular shape, as spherical portions of the inner surface 22 of the mold cavity 14.

The mold 12 of the preferred embodiment has four injection gates 29 configured to receive injection nozzles 30. The number of injection gates may range from 1 to 20, preferably 3 to 10. Nozzles 30 may be place one-to-one at each injection gate 29. Alternatively, a single nozzle may be used for injection, and is connected to all the injection gates 29 through a runner system. The gates 29 are preferably spaced at equal angles and distance from each other around the mating surfaces 18. In this case, as there are four gates 29, they are spaced at about 90 degrees from each other. When the mold 12 is closed, with the mold portions 14 fully contacting each other, the gates 29 communicate the cavity space 20 to the exterior of the mold 12, and the nozzles 30 can seat tightly in the gates 29. Preferably, the nozzles 30 can be moved into the gates 29 after the mold portions 14 are pressed together.

The nozzles 30 are configured to inject a reaction material 32 that forms the desired cover or layer. The reaction material 32 comprises at least two reactants that form a polymer such as polyurethane, polyurea, epoxy, or unsaturated polyester; preferably the polymer is a thermoset or thermoplastic polyurethane or polyurea. The first reactant includes a polyisocyanate or a prepolymer or quasi-prepolymer having the reaction product of at least one polyisocyanate with a polyol, polyamine or epoxy-containing compound. The second reactant includes at least one curing agent that is a polyol, polyamine or epoxy-containing compound. Conventional additives for the reaction material 32 include, but are no limited to, curing agents, crosslinking agents, catalysts, fillers, accelerators, processing aids, processing oils, plasticizers, foaming agents, colorants, radical quenchers, as well as other additives known to one of ordinary skill in the art. Suitable choices for the polyisocyanate, polyol, polyamine, epoxy-containing compound, additives and other materials for the first and second reactants are disclosed in co-pending U.S. patent application Ser. Nos. 09/565,108, 09/833,598 and 10/072,395, as well as in U.S. Pat. Nos. 5,484,870 and 6,083,119, all of which are incorporated by reference in their entirety.

The reactants in their liquid form are stored in separate tanks and preheated to about 90° F. to 150° F. prior to the RICM process. Additives such as curing agents and catalysts may be pre-mixed with one or both reactants and transferred into the storage tanks. The reactants are metered in the desired weight-to-weight ratio and fed into an impingement mix head, where mixing of the reactants occur under a hydraulic pressure $P_i$ that is preferably between about 1,000 psi and about 5,000 psi, more preferably between about 1,500 psi and about 3,000 psi. Alternatively, the additives may be stored in tanks separate from the two reactants, and added directly into the mix head only during the mixing process. The mix head can be an in-line device such as a peanut mixer, or a mixing chamber integrated within the mold. Other methods of mixing, such as mechanical mixing, and designs of mix heads are well know to one of skill in the art of liquid mixing. Upon thorough mixing, the mixture of the reactants is rapidly injected into the mold 12, in where a polymerization reaction takes place between the reactants to form a coherent, one-piece molded layer or cover of the material 32 around the golf ball component 10. Both the mix head and the mold 12 are heated to ensure proper viscosity of the material 32 for injection.

Figure 3:
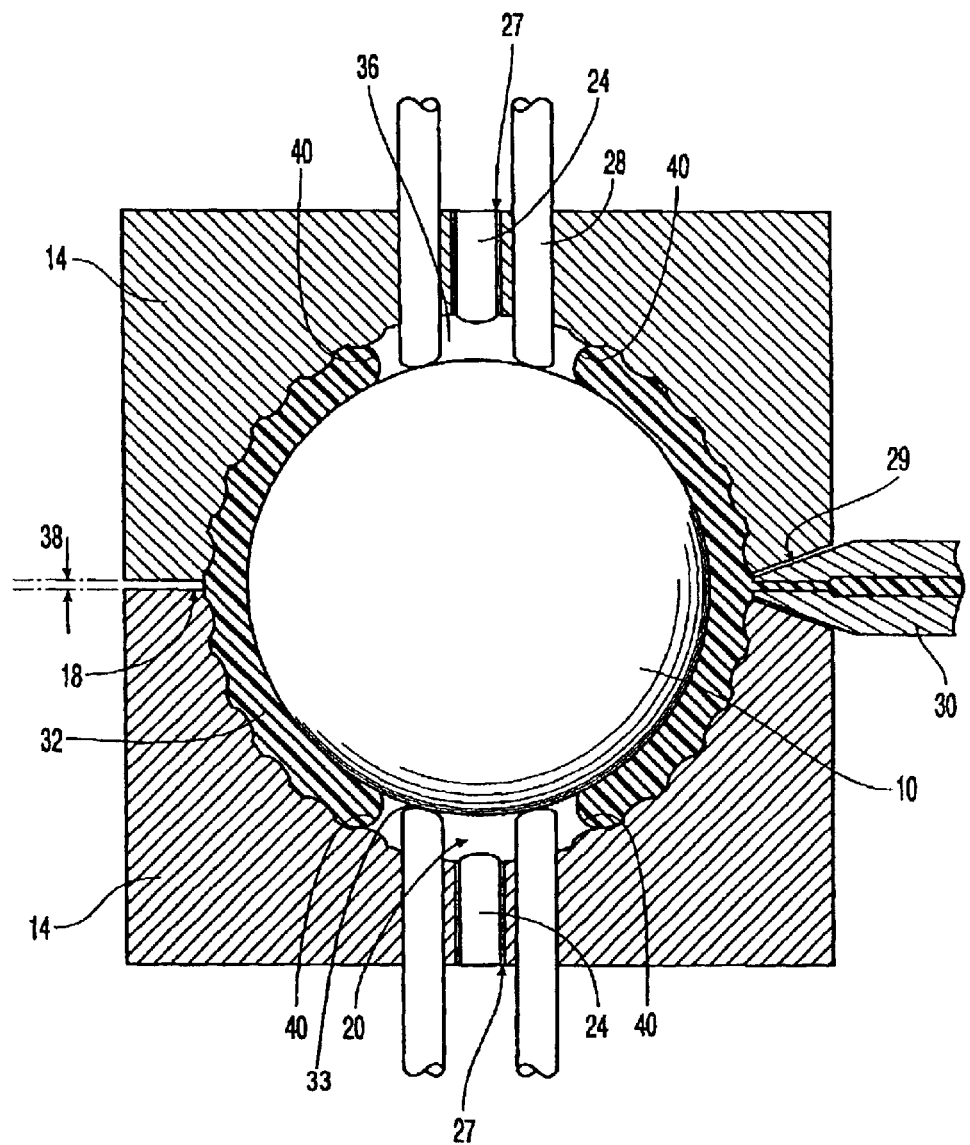
FIG. 3 is a diagrammatic cross-sectional view of the mold in a partially open reaction injection molding position.

As shown in FIG. 2, prior to injecting the material 32, the mold portions 14 of the mold 12 are held together in a closed injection position, preferably by a hydraulic press (not shown) under a injection tonnage $T_i$. $T_i$ can be about 40 kN for a molding machine that includes four individual golf ball molds 12, although the molding machine preferably includes 4–8 sets of the mold 12. The material 32 is injected into the mold 12 under the hydraulic pressure $P_i$, which is sufficient to overcome the holding tonnage $T_i$ and separate the mold portions 14 by an opening 38 (see FIG. 3). As a result, the mold 12 is now in a partially open injection position. The hydraulic pressure $P_i$ may be adjusted to control the size of the opening 38 and consequently the injection speed of the material 32. Preferably, the opening 38 is large enough to vent air rapidly from the cavity space 20 during injection to prevent buildup of intra-cavity pressures and slowdown of injection, while small enough to contain the material 32 within the cavity space 20 and prevent the material 32 from flashing through. Other factors to be considered when determining the $P_i$ include, among others, laminar and turbulent flows, air bubble generation, fluid viscosity and reaction rate of the material 32. The opening 38 preferably is at least about 0.001 inches, more preferably ranges from about 0.001 inches to about 0.015 inches, and most preferably from about 0.001 inches to about 0.01 inches. The opening 38 is maintained throughout the entire injection process, as fronts 40 of the material 32 move through and fill the cavity space 20. When a sufficient amount of material 32 has been injected into the cavity space 20 to support the golf ball component 10 substantially in the predetermined position, the support pins 28 are disengaged from the golf ball component 10 and retracted out of the cavity space 20.

As the injection continues, the material 32 flows around the golf ball component 10, displacing the air and filling the remaining portions of the cavity space 20 left by the retracted support pins 28, while the air vents primarily from opening 38. When the fronts 40 contact each other, they form weld lines. At this stage in the RICM process, as in other RIM methods, the cover material 32 is discontinuous across the weld lines. At the same time, the liquid reactants react rapidly to gel and form a polymer such as polyurethane, polyurea, epoxy, and unsaturated polyester.

Figure 4:
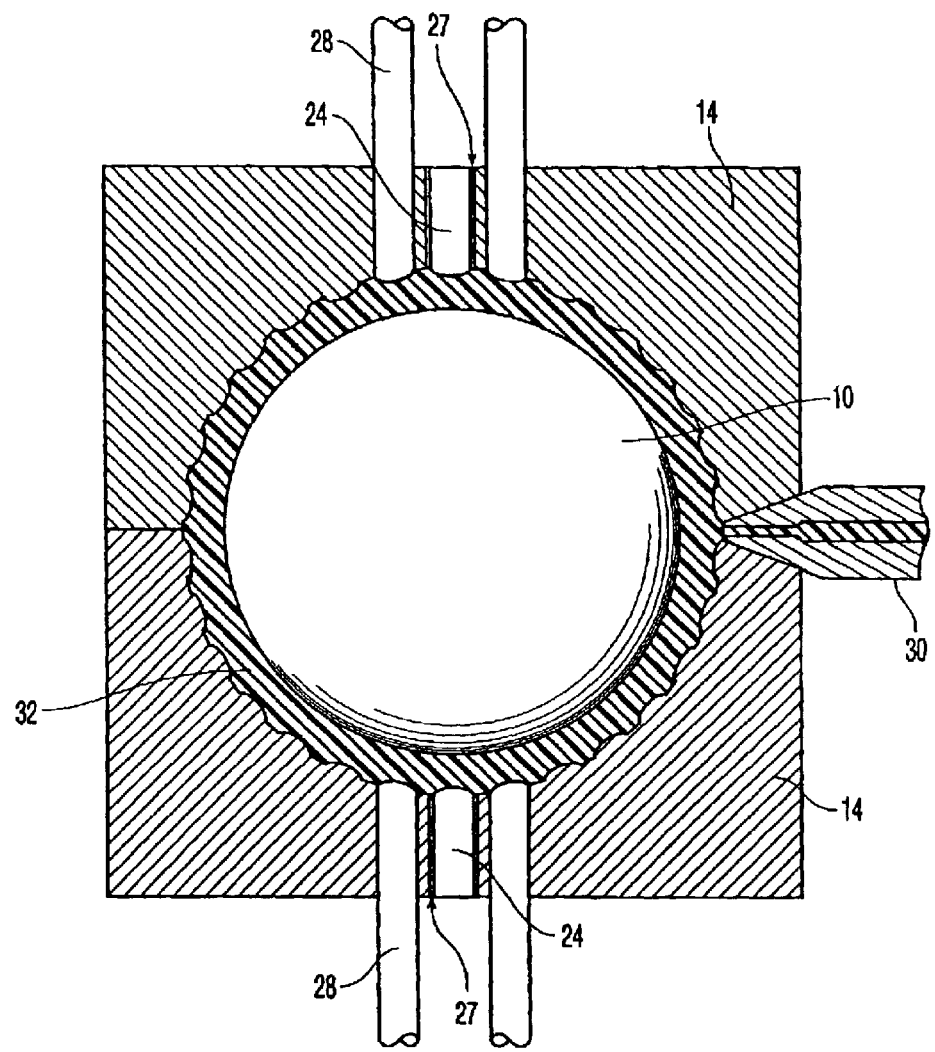
FIG. 4 is a diagrammatic cross-sectional view of the mold in a closed compression molding position with support pins retracted.

Referring to FIG. 4, the mold portions 14 are then compressed towards each other under a compression tonnage $T_c$ that is exerted by the same hydraulic press, to close the opening 38 and bring the mold 12 to a closed compression mold position. The polymer material resulted from the reaction within the material 32, which is preferably still substantially in a molten state, is now compression molded into the desired layer or cover around the golf ball component 10. Preferably $T_c$ is at least about 20 percent greater than $T_i$, more preferably it is about twice the magnitude of $T_i$. Alternatively, the hydraulic pressure $P_i$ can be removed to allow the injection tonnage $T_i$ to close the mold portions, thereby initiating compression molding without the additional compression tonnage $T_c$. Also preferably, the compression molding is commenced once the material 32 has been injected to fill at least about 40% of the cavity space 20, more preferably at least about 50% of the cavity space 20, and most preferably at least about 80% of the cavity space 20. Little or no further injection of the material 32 is necessary once the mold 12 is closed under $T_c$.

The compression molding of the material 32 relieves a significant portion of the internal stresses therein, including those created at weld lines and by friction with the golf ball component 10 and the inner surface 22 of the mold portions 14. This compression fuses the material 32 at weld lines, significantly reducing imperfections in the material 32 as a whole and the discontinuities at the weld lines. It also aids in the release of the component 10 from the mold portions 14. In processes where the retractable support pins 28 are used, the compression molding also closes voids left by the retracted pins 28. Another advantage of the RICM process, as compared to simple RIM, is that the compression molding packs in the material 32 much tighter and more completely into the features of the cavity space 20, such as corners around the protrusions 23 that form the dimples in the finished golf ball cover. This provides an improved finish to the molded product by forming sharper dimple edges.

During the compression molding process, the mold 12 is preferably maintained at a substantially constant temperature of between about 40° F. and about 90° F., most preferably about 50° F. This can be achieved by flowing a fluid, such as cool water, around or through passages within the mold portions 14. This temperature should be below the freezing point of the material 32. Thus, the material 32 begins to solidify as soon as it is injected. The de-molding, or release, process constitutes removing the completed layer or cover with the golf ball component encapsulated therein as a whole subassembly from the mold 12.

In an alternative embodiment of the present invention, the mold portions 14 are held open with a predetermined opening 38 prior to injecting the reaction material 32 into the cavity space 20 of the mold 12. The opening 38 preferably is at least about 0.001 inches, more preferably ranges from about 0.001 inches to about 0.015 inches, and most preferably from about 0.001 inches to about 0.01 inches. The reactants for the material 32 are heated in their reservoir tanks, and then forced into the mix head under the hydraulic pressure $P_i$. The nozzles 30 and the optional runner system are maintained above the melting temperatures of the reactants, while the mold 12 is maintained below the melting temperature of the material 32. The runner system reduces if not eliminates any sprues attached to the molded layer.

Figure 5:
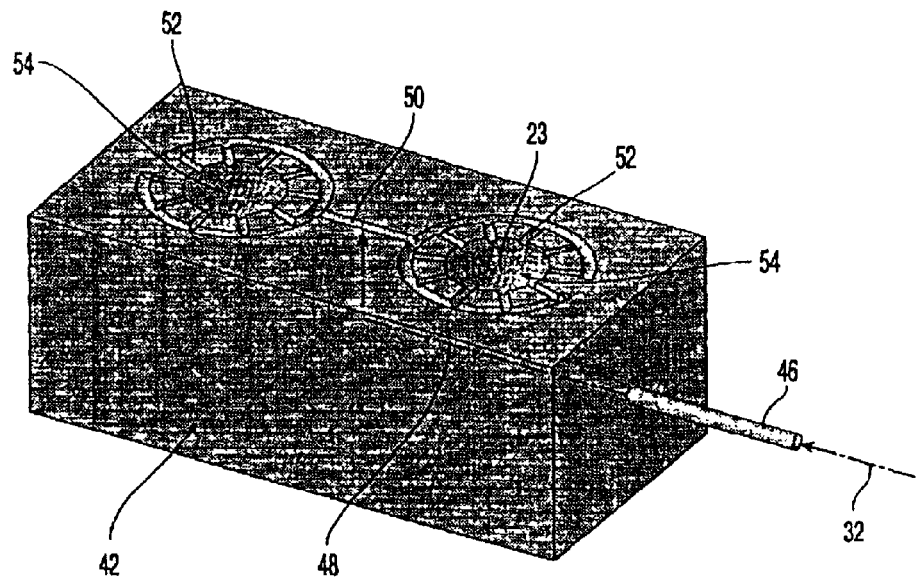
FIG. 5 is a diagrammatic perspective view of another lower mold portion constructed according to the invention.
Figure 6:
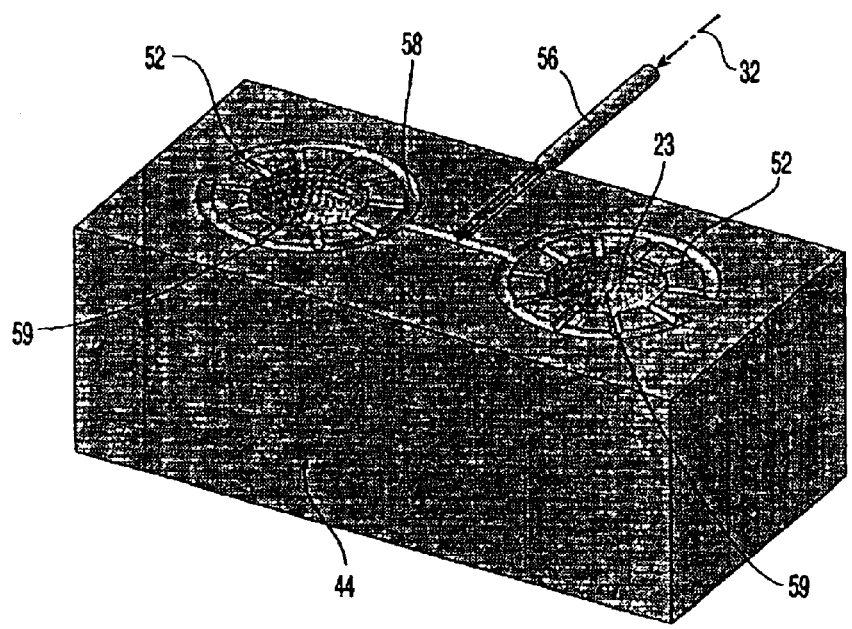
FIG. 6 is a diagrammatic perspective view of yet another lower mold half constructed according to the invention.

FIGS. 5 and 6 show a more preferred embodiment of lower mold portions 42 and 44, each for molding two layers or covers according to the invention. Mold portions 42 and 44 are configured to mate with corresponding upper mold portions to form the layer or cover around the ball component such as a core. Mold portion 42 of FIG. 5 employs a hot-to-cold runner system. Nozzle 46 is placed against the mold portion 42 to inject material 32 through internal, hot runner 48 within the mold portion 42 to runner 50 in the parting line between the upper and lower mold portions. Runner 50 feeds ten injection gates 52 surrounding each mold cavity 54. Alternatively, mold portion 44 of FIG. 6 uses a cold runner system. Nozzle 56 injects the material 32 directly into a runner system of runners 58 that is disposed completely in the parting line of the mold during the RICM process. As in mold portion 42 of FIG. 6, the runners 58 lead into two mold cavities 59 through gates 52.

The RICM process of the present invention reduces residual stresses in the molded layer or cover, enhances the homogeneity of the material that forms the molded layer or cover, strengthens the weld lines, and enables easy release of the molded balls from the molds. The RICM process also improves adhesion and achieves better concentricity between the molded layer or cover and the component therein. The RICM process further produces sharper details on the molded layer or cover, thereby improving aesthetic appearance, among other things. The open mold design of the RICM is superior to conventional closed mold design in RIM. Rapid air venting through the opening 38 shortens injection time and reduces the hydraulic pressure $P_i$ necessary for injecting the material 32 into the molds.

Figure 7:
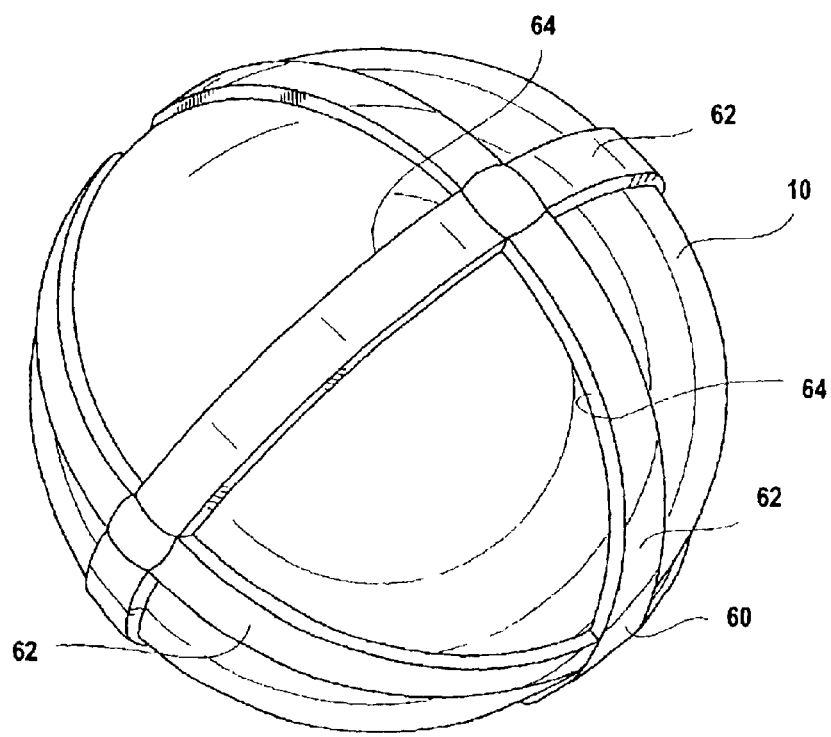
FIG. 7 is a view of a golf ball component covered with a layer of a lattice network in the form of a spherical octahedron.

The thin layer of the present invention may be an outer core layer, an intermediate layer, or an inner cover layer. The thin layer may be a continuous layer such as a spherical shell or a spherical lattice network, or a discontinuous layer having a plurality of discrete elements that are uniform in their thickness. Preferably, the thin layer covers from about 10% to about 100% of the surface area of the underlying golf ball component such as the core. More preferably, the thin layer covers from about 30% to about 100% of the surface area of the underlying component. The discrete elements of the discontinuous layer may comprise islands having various shapes such as circles, triangles and hexagons. The lattice network can be of any shape and form, preferably having at least three bands extending along great circle paths of the underlying golf ball component such as the core. More preferably the bands along great circle paths form a spherical Platonic or Archimedean solid. Most preferably, the lattice network is in a spherical form of octahedron, cubactahedron, icosahedron, or icosadodecadron. FIG. 7 illustrates the golf ball component 10 covered by a lattice network 60 of a spherical octahedron formed from three intersecting bands 62 that extend along great circle paths and at right angles to each other. The bands 62 form spherical triangle openings 64 that expose portions of the component 10.

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method of molding a thin layer of a thermoset or thermoplastic material around a golf ball component within a mold, comprising:
   placing the golf ball component within a mold cavity defined by opposing mold potions of the mold to leave a cavity space between the component and the mold portions;
   holding the opposing mold portions together in a closed position by a first tonnage;
   providing a pre-mixed reaction mixture that comprises at least two reactants;
   injecting the reaction mixture under a hydraulic pressure into the cavity space to form a pressurized mixture;
   overcoming the first tonnage by pushing the mold portions by the pressurized mixture apart from each other to a partially open position with an opening therebetween;
   allowing the reaction mixture to react partially within the cavity space;
   compressing the mold portions toward each other to the closed position; and
   allowing the reaction mixture to further react to form the thin layer of the thermoset or thermoplastic material immediately about the component
   wherein the thin layer has a thickness of less than about 0.03 inches.

2. The method of claim 1, further comprising:
   holding the component with support members to be substantially concentric to the mold cavity during the injecting of the reaction mixture; and
   removing the support members after a sufficient amount of the mixture has been injected to maintain the component substantially in the predetermined position.

3. The method of claim 2, wherein the support members comprise retractable pins.

4. The method of claim 1, further comprising providing a second tonnage sufficient to overcome the pressurized mixture and compress the mold portions to the closed position, wherein the second tonnage is at least about 20 percent greater than the first tonnage.

5. The method of claim 1, further comprising removing the hydraulic pressure to allow the compressing the mold portions.

6. The method of claim 1, wherein the at least two reactants comprises an isocyanate and a polyol or polyamine.

7. The method of claim 1, wherein the reaction mixture further comprises at least one additive comprising curing agents, crosslinking agents, catalysts, fillers, accelerators, processing aids, processing oils, plasticizers, foaming agents, colorants, or radical quenchers.

8. The method of claim 1, wherein the thin layer has a thickness of from about 0.0005 inches to about 0.02 inches.

9. The method of claim 1, wherein the opening between the mold portions in the partially open position is at least about 0.001 inches.

10. The method of claim 1, further comprising:
    heating the reactants to a temperature between about 90° F. and about 150° F.;
    mixing the reactants in a mix head through a process comprising impingement or mechanical mixing to form the reaction mixture; and
    cooling the thermosetting material formed from the reaction mixture to a temperature below the freezing point of the thermosetting material after the compressing the mold portions.

11. The method of claim 1, wherein the component has a surface area, and the layer covers from about 10% to about 100% of the surface area of the component.

12. The method of claim 1, wherein the layer comprises a continuous spherical lattice network.

13. The method of claim 12, wherein the spherical lattice network comprises octahedron, cubactahedron, icosahedron, or icosadodecahedron.

14. The method of claim 1, wherein the layer is a discontinuous layer comprising a plurality of discrete circular, triangular, or hexagonal elements.

15. A method of molding a layer of a thermoset or thermoplastic material around a golf ball component within a mold, comprising:

placing the golf ball component within a mold cavity defined by opposing mold potions of the mold to leave a cavity space between the component and the mold portions substantially surrounding the component;

providing a pre-mixed reaction mixture that comprises at least two reactants comprising an isocyanate and a polyol or polyamine;

injecting the mixture under the hydraulic pressure into the cavity space to form a pressurized mixture;

pushing the mold portions apart to a partially open position with an opening therebetween by overcoming a first tonnage with the pressurized mixture;

allowing the reaction mixture to partially react within the cavity space;

compressing the mold portions toward each other to a closed position; and allowing the reaction mixture to further react to form the layer of the thermoset or thermoplastic material to substantially encapsulate the component.

16. The method of claim 15, wherein the compressing of the mold portions begins after at least about 80 percent of the cavity space is injected with the reaction mixture.

17. The method of claim 15, wherein the reaction mixture is injected into the cavity space at a plurality of locations.

18. The method of claim 15, further comprising providing a tonnage sufficient to compress the mold portions to the closed position.

19. The method of claim 15, wherein the layer has a thickness of from about 0.0005 inches to about 0.02 inches.

20. The method of claim 15, wherein the layer is continuous or discontinuous.

21. The method of claim 15, wherein the opening between the mold portions in the partially open position is at least about 0.001 inches.

22. A method of molding a layer of a thermoset material around a golf ball component within a mold, comprising:

placing the golf ball component on a support member within a mold cavity defined by opposing mold potions of the mold to leave a cavity space between the component and the mold portions substantially surrounding the component;

providing a pre-mixed reaction mixture that comprises at least two reactants;

injecting the mixture under the hydraulic pressure into the cavity space through an opening of at least about 0.001 inches between the mold portions in a partially open position;

filling at least about 80% of the cavity space with the mixture in the partially open position;

allowing the reaction mixture to partially react within the cavity space;

compressing the mold portions toward each other under a tonnage to a closed position; and allowing the reaction mixture to further react to form the layer of the thermoset or material no greater than about 0.03 inches in thickness to substantially encapsulate the component.

* * * * *